(12) United States Patent
Sugihara et al.

(10) Patent No.: US 11,377,507 B2
(45) Date of Patent: Jul. 5, 2022

(54) METHOD FOR PRODUCING VINYL ETHER POLYMER CONTAINING OXYETHYLENE CHAIN BY RADICAL POLYMERIZATION

(71) Applicant: MARUZEN PETROCHEMICAL CO., LTD., Tokyo (JP)

(72) Inventors: Shinji Sugihara, Fukui (JP); Masahiro Endo, Ichihara (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 97 days.

(21) Appl. No.: 16/638,969

(22) PCT Filed: Jul. 17, 2018

(86) PCT No.: PCT/JP2018/026759
§ 371 (c)(1),
(2) Date: Feb. 13, 2020

(87) PCT Pub. No.: WO2019/044221
PCT Pub. Date: Mar. 7, 2019

(65) Prior Publication Data
US 2020/0190234 A1   Jun. 18, 2020

(30) Foreign Application Priority Data
Aug. 31, 2017   (JP) .............................. JP2017-167740

(51) Int. Cl.
C08F 16/26 (2006.01)
C08F 2/10 (2006.01)
C08K 5/23 (2006.01)
C08F 2/38 (2006.01)

(52) U.S. Cl.
CPC ............... *C08F 16/26* (2013.01); *C08F 2/10* (2013.01); *C08F 2/38* (2013.01); *C08K 5/23* (2013.01)

(58) Field of Classification Search
CPC ...................................................... C08F 16/26
See application file for complete search history.

(56) References Cited

U.S. PATENT DOCUMENTS

| | | | |
|---|---|---|---|
| 2,869,997 A | 1/1959 | Richter et al. | |
| 2008/0221293 A1 | 9/2008 | Yoneda et al. | |
| 2009/0312504 A1* | 12/2009 | Lorenz ................ | C04B 24/2647 526/80 |
| 2013/0184420 A1* | 7/2013 | Kawabata ........... | C08F 290/062 526/75 |
| 2015/0005467 A1 | 1/2015 | Sugihara et al. | |
| 2018/0179305 A1 | 6/2018 | Sugihara et al. | |

FOREIGN PATENT DOCUMENTS

| | | |
|---|---|---|
| CN | 103119074 A | 5/2013 |
| JP | 2009-510175 A1 | 3/2009 |
| JP | 2013-166829 A1 | 8/2013 |
| JP | 2015048392 A * | 3/2015 |
| JP | 2016-050266 A1 | 4/2016 |
| JP | 5936184 B2 | 6/2016 |
| JP | 2017-014438 A1 | 1/2017 |
| TW | 201402616 A | 1/2014 |
| WO | 2013/099427 A1 | 7/2013 |
| WO | 2017/006817 A1 | 1/2017 |

OTHER PUBLICATIONS

Masatoshi Miyamoto, et al., "Radical Polymerization of Oligoethylene Glycol Methyl Vinyl Ethers in Protic Polar Solvents," *Macromol. Chem. Phys.*, 199 (1998), pp. 119-125.
Extended European Search Report (Application No. 18852057.1) dated Apr. 1, 2021.
International Search Report and Written Opinion (Application No. PCT/JP2018/026759) dated Oct. 2, 2018.
English Translation of the International Report on Patentability (Chapter I)(Application No. PCT/JP2018/026759) dated Mar. 12, 2020, 6 pages.
Japanese Office Action (Application No. 2017-167740) dated Aug. 13, 2021 (with English translation).
Chinese Office Action (Application No. 201880045171.2) dated Oct. 28, 2021 (with English translation).

* cited by examiner

*Primary Examiner* — Nicole M. Buie-Hatcher
(74) *Attorney, Agent, or Firm* — Burr & Brown, PLLC

(57) ABSTRACT

A method for producing a vinyl ether polymer containing an oxyethylene chain is provided, including a the step of polymerizing vinyl ether represented by formula (1) in the presence of water as a polymerization solvent, a basic compound as an additive, and an organic azo-based compound as a radical polymerization initiator, and in pH of 5 or more, and the amount of the basic compound used is 0.01 to 0.5 mol % based on an amount of the vinyl ether. Formula (1) is

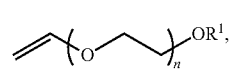

(1)

wherein R1 represents an alkyl group having 1 to 3 carbons, and n represents an integer from 1 to 10.

6 Claims, 1 Drawing Sheet

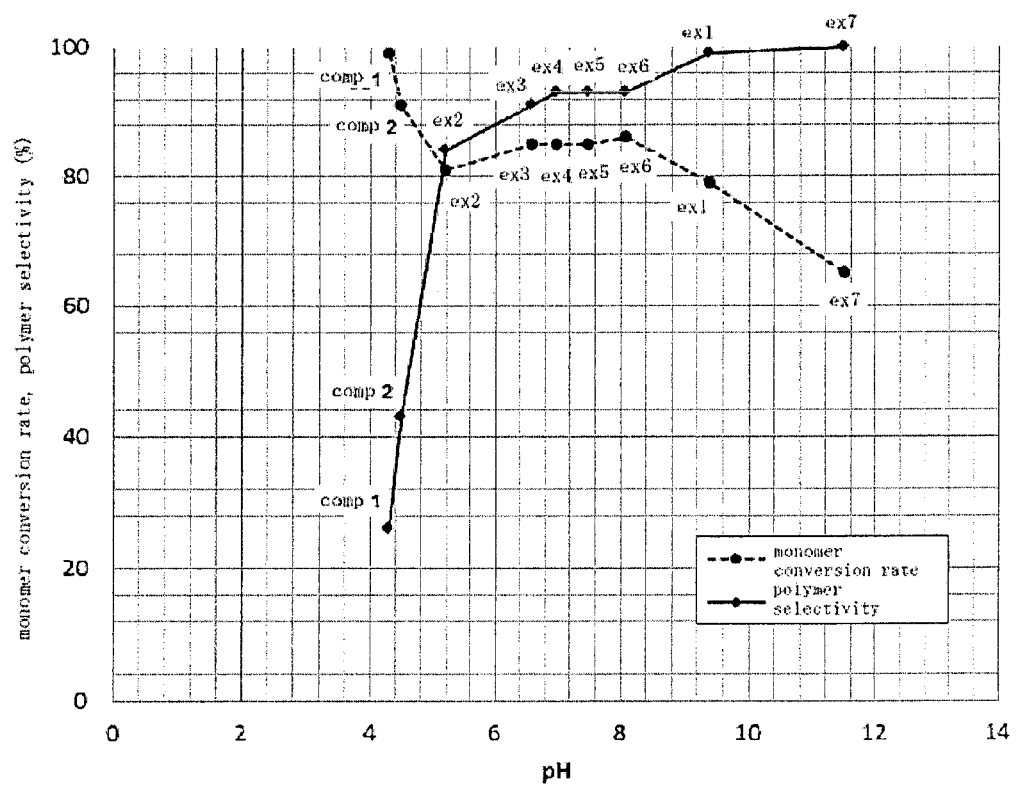

METHOD FOR PRODUCING VINYL ETHER POLYMER CONTAINING OXYETHYLENE CHAIN BY RADICAL POLYMERIZATION

FIELD OF THE INVENTION

The present invention relates to a method for producing a vinyl ether polymer containing an oxyethylene chain by radical polymerization.

BACKGROUND OF THE INVENTION

A vinyl ether polymer containing an oxyethylene chain is used as a blend component of adhesives, paints and lubricants. It has the characteristics of heat stimulation response and biocompatibility, and by using its characteristics, is applicable to dispersants, resins for metal recovery, anti-thrombogenic materials, and the like.

Since generally vinyl ether has an electron-releasing substituent, a vinyl ether polymer is known to be obtained by cation polymerization. However, since cation polymerization is normally conducted under low temperature of 0° C. or less, temperature control is not easy in the industrial scale due to reaction heat at the time of polymerization. In addition, since the initiator used in cation polymerization becomes deactivated by water, the reaction needs to be conducted in an anhydrous state and in inert gas. Therefore, it is difficult to produce the vinyl ether polymer by cation polymerization industrially low in cost and in an efficient manner.

Conventionally, a vinyl ether monomer is a low radical polymerizable monomer, and it had been difficult to obtain a vinyl ether polymer by radical polymerization. However, according to a recent study, it is known that by establishing suitable reaction conditions and using a specific vinyl ether monomer will promote the radical polymerization to give a vinyl ether polymer (see Patent Documents 1 and 2).

For example, Patent Document 1 discloses a method for obtaining a vinyl ether polymer containing a hydroxyl group such as 2-hydroxyethyl vinyl ether and 4-hydroxybutyl vinyl ether, using 2,2'-azobisisobutyronitrile (AIBN) as an initiator in bulk polymerization or in a water solvent. However, polymerization using AIBN resulted in low monomer conversion rate, and polymerization was not efficiently conducted.

Patent Document 1 also discloses a case in which the monomer conversion rate of the vinyl ether polymer containing a hydroxyl group was improved by conducting polymerization in conditions in which a non-nitrile azo-based initiator such as 2,2'-azobis isomethyl butyrate (MAIB) was used as an initiator in an alcoholic solvent. However, in this condition, polyacetal was generated depending on the kind of alcohols used as the solvent, and the yield of the target vinyl ether polymer containing a hydroxyl group was confirmed to be significantly reduced, despite of the case in which an alcoholic-based solvent and a non-nitrile azo-based initiator were used.

Patent Document 2 discloses a polymerization example in which improvement was made to the conditions as disclosed in Patent Document 1, and with respect to the vinyl ether containing a hydroxyl group, there was disclosed a polymerization case in which a homopolymer of the vinyl ether was obtained in a high conversion rate by using MAIB as the initiator.

On the other hand, in relation to the vinyl ether containing an oxyethylene chain, Patent Document 1 does describe the copolymerization case of the vinyl ether containing a hydroxyl group but does not establish the condition for the homopolymerization.

PRIOR ART REFERENCES

Patent Documents

[Patent Document 1] Japanese Patent Laid-Open Publication No. 5936184
[Patent Document 2] Japanese Patent Application Laid-Open Publication No. 2017-014438

SUMMARY OF THE INVENTION

Problems to be Solved by the Invention

When homopolymerization of the vinyl ether containing an oxyethylene chain was conducted under the conditions as disclosed in Patent Document 2, it was confirmed that decomposition of the monomer of vinyl ether containing an oxyethylene chain occurred and the yield of the polymer was significantly reduced, and polymerization of the monomer of vinyl ether containing an oxyethylene chain was not conducted efficiently.

The present invention has been made in consideration of the above-described current status and an object of the present invention is to provide a method for producing a vinyl ether polymer containing an oxyethylene chain, wherein decomposition of the monomer and generation of polyacetal are suppressed, in a stable and efficient manner.

Means for Solving the Problems

In order to solve the above-described problems, the present inventors intensively studied to find that radical polymerization of vinyl ether containing an oxyethylene chain under specific polymerization conditions can suppress decomposition of the monomer and generation of polyacetal, and as a result, a vinyl ether polymer containing an oxyethylene chain is obtained in a more higher monomer conversion rate and polymer selectivity, thereby completing the present invention.

That is, the present invention provides <1> to <7> as follows.
<1> A method for producing a vinyl ether polymer containing an oxyethylene chain, comprising the step of polymerizing vinyl ether represented by the following formula (1):

wherein $R^1$ represents an alkyl group having 1 to 3 carbons, and n represents an integer from 1 to 10,
in the presence of water as a polymerization solvent, a basic compound as an additive, and an organic azo-based compound as a radical polymerization initiator, and in pH of 5 or more.
<2> The production method according to <1>, wherein the amount of the basic compound used is 0.01 to 0.5 mol % based on the vinyl ether.
<3> The production method according to <1> or <2>, wherein the basic compound is an alkali metal hydroxide or an amine compound.

<4> The production method according to any one of <1> to <3>, wherein the organic azo-based compound is a compound represented by the following formula (2):

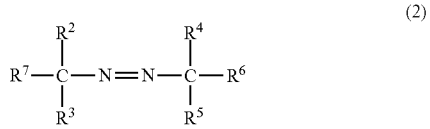

wherein $R^2$ to $R^5$ each independently represent a hydrogen atom or an alkyl group; and $R^6$ and $R^7$ each independently represent a nitrile group, an ester group having an alkoxy moiety optionally having a substituent, or an amide group having an alkylamino moiety optionally having a substituent.

<5> The production method according to any one of <1> to <4>, wherein the organic azo-based compound is an azo ester compound.

<6> The production method according to any one of <1> to <5>, wherein the weight average molecular weight of the vinyl ether polymer is 3000 to 50000.

<7> The production method according to any one of <1> to <6>, wherein the polymer selectivity is 70% or more.

Effect of the Invention

According to the method for producing a vinyl ether polymer containing an oxyethylene chain of the present invention, decomposition of the monomer and generation of polyacetal can be suppressed by radical polymerization of vinyl ether containing an oxyethylene chain under a specific polymerization condition, and as a result, such polymer is obtained in a more higher monomer conversion rate and polymer selectivity.

BRIEF DESCRIPTION OF THE FIGURE

The Figure shows the monomer conversion rate (MOVE) and the polymer selectivity (PMOVE) in Examples 1 to 7 and Comparative Examples 1 and 2.

DETAILED DESCRIPTION OF THE INVENTION

<Method for Producing Vinyl Ether Polymer Containing Oxyethylene Chain>

The method for producing a vinyl ether polymer containing an oxyethylene chain of the present invention is characterized in comprising the step of conducting radical polymerization of the vinyl ether containing an oxyethylene chain under specific conditions. Detailed description of such radical polymerization step is described below.

<Monomer Component>

The vinyl ether containing an oxyethylene chain used in the present invention is represented by the following formula (1):

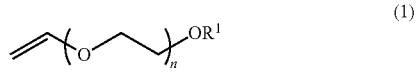

wherein $R^1$ represents an alkyl group having 1 to 3 carbons, and n represents an integer from 1 to 10.

The number of carbons of the alkyl group represented by $R^1$ in formula (1) is 1 to 3 and preferably 1 or 2. The alkyl group may be straight chained or branched, and specifically includes, a methyl group, an ethyl group, an n-propyl group, and an isopropyl group. Preferred as the alkyl group amongst these are the methyl and ethyl groups and more preferred is the methyl group.

In formula (1), n is an integer of 1 to 10, preferably 1 to 6, more preferably 1 to 4, and more preferably 1 to 3.

Examples of the vinyl ether monomer represented by formula (1) include: 2-methoxy ethyl vinyl ether, 2-ethoxy ethyl vinyl ether, 2-(2-methoxyethoxy)ethyl vinyl ether, 2-(2-ethoxyethoxy)ethyl vinyl ether, 2-(2-(2-ethoxyethoxy)ethoxy)ethyl vinyl ether, 2-(2-(2-(2-methoxyethoxy)ethoxy)ethoxy)ethyl vinyl ether, 2-(2-(2-(2-ethoxyethoxy)ethoxy)ethoxy) ethyl vinyl ether.

<Polymerization Solvent>

In the present invention, water is used essentially as a polymerization solvent. A water-soluble organic solvent may be used in combination as the polymerization solvent, as long as the effect of the present invention is not impaired. "Water-soluble", as used herein, means that solubility to water at 25° C. (amount of solute against 100 g of water) is 1 g or more.

The amount of water used is without particular limitation, 5 to 2000 parts by mass and preferably 10 to 1000 parts by mass, based on 100 parts by mass of the vinyl ether containing an oxyethylene chain. The amount of water based on the total amount of the polymerization solvent is 10% by mass to 100% by mass, preferably 20% by mass or more, and more preferably 50% by mass or more.

Examples of the above-described water-soluble organic solvent include: monovalent alcoholic solvents such as methanol, ethanol, and isopropanol; polyvalent alcoholic solvents such as ethylene glycol, glycerine, and diethylene glycol; ether alcohols such as cellosolve, methyl cellosolve, ethylene glycol monomethyl ether, and ethylene glycol monoethyl ether; amides such as N,N-dimethyl formamide and N-methyl pyrrolidone; sulfoxides such as dimethyl sulfoxide; ketones such as acetone and methyl ethyl ketone; and cyclic ethers such as tetrahydrofurane and dioxane; and these may be used alone in one kind or in a combination of 2 or more kinds.

<Additive>

Since the pH at the time of polymerization is 5 or more, it is essential to add a basic compound as an additive. The pH at the time of polymerization is preferably 5 to 14 and more preferably 6 to 12. If the pH at the time of polymerization is smaller than 5 (acidic to slightly acidic), the vinyl ether containing an oxyethylene chain will lead to hydrolysis reaction and decompose into alcohol and aldehyde due to the hydrogen ion in the reaction system, causing significant reduction in the polymer yield; thus a basic compound needs to be added.

In addition, as a cationic species of the basic compound, there is a cationic species in a small size that is capable of interacting with the vinyl ether, so it is considered the cationic species attracts the electron from an oxygen atom of the vinyl ether monomer, resulting in improvement of the radical polymerization of the vinyl group. As such, radical polymerization is considered to proceed even in the vinyl ether containing an oxyethylene chain with low radical polymerization properties in the polymerization conditions of the present invention.

The amount of the basic compound used is without particular limitation, 0.01 to 0.5 mol % and preferably 0.05 to 0.2 mol %, based on 1 mol of the vinyl ether containing an oxyethylene chain.

Examples of the basic compound that has both the effects of suppression of hydrolysis of vinyl ether and improvement of radical polymerization include, alkali metal hydroxides such as lithium hydroxide and sodium hydroxide, and amine compounds such as ammonia and triethyl amine. In the present invention, these may be used alone in one kind, or in a combination of 2 or more kinds.

<Radical Polymerization Initiator>

In the present invention, a conventional radical polymerization initiator can be used, as long as it is an organic azo-based compound.

The amount of radical polymerization initiator used is preferably 0.1 to 50 mol %, more preferably 0.2 to 20 mol %, and further preferably 1 to 10 mol %, based on 1 mol of the vinyl ether containing an oxyethylene chain.

In the present invention, the azo-based compound used may be one represented by the following formula (2):

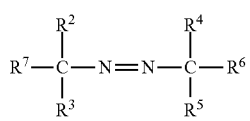

(2)

wherein $R^2$ to $R^5$ each independently represent a hydrogen atom or an alkyl group; and $R^6$ and $R^7$ each independently represent a nitrile group, an ester group having an alkoxy moiety optionally having a substituent, or an amide group having an alkylamino moiety optionally having a substituent.

Examples of the above-described organic azo-based compound include: azonitrile compounds such as 2,2'-azobisisobutyronitrile, 2,2'-azobis(2-methyl butyronitrile), 2,2'-azobis(2,4-dimethylvaleronitrile), 2,2'-azobis(4-methoxy-2,4-dimethylvaleronitrile), and 1,1'-azobis(cyclohexane-1-carbonitrile); azo ester compounds such as 2,2'-azobis methyl isobutyrate; azoamide compounds such as 2,2'-azobis[2-(3,4,5,6-tetrahydro pyrimidine-2-yl)propane]dihydrochloride, 2,2'-azobis{2-methyl-N-[1,1-bis(hydroxymethyl)-2-hydroxyethyl]-propionamide, 2,2'-azobis[2-methyl-N-(2-hydroxylethyl)-propionamide], and 2,2'-azobis[N-(2-propenyl)-2-methyl propionamide]; and 2,2'-azobis(2,4,4-trimethyl pentane). Preferably used amongst these are the azo ester compounds, in view of suppressing polyacetalization.

<Vinyl Ether Polymer Containing Oxyethylene Chain>

In the present invention, the weight average molecular weight (Mw) and the molecular weight distribution (Mw/Mn) of the vinyl ether polymer containing oxyethylene chain are not particularly limited and may be appropriately selected depending on the application. For example, the weight average molecular weight (Mw) is preferably within the range from 3000 to 50000 and more preferably within the range from 4000 to 30000, in view of exhibiting macromolecular properties. The molecular weight distribution (Mw/Mn) is preferably more than 1.5 and less than 2.0 and more preferably from 1.55 to 1.90, in view of homogenizing the polymer properties.

In the present specification, the weight average molecular weight (Mw) and the molecular weight distribution (Mw/Mn) are measured values by GPC (gel permeation chromatography), and can be measured with the measuring conditions as mentioned below.

In the present invention, the monomer conversion rate is without particular limitation, preferably 40% or more, more preferably 50% or more, and further preferably 60% or more.

In the present invention, the polymer selectivity is without particular limitation, preferably 70% or more, more preferably 80% or more, and further preferably 90% or more.

The "monomer conversion rate" as used herein, is obtained by calculating the rate of the monomers consumed during polymerization (or after polymerization) based on the total amount of the monomers before polymerization, from the peak area of the monomers measured by gas chromatography (GC) in measuring conditions to be explained below (therefore, with respect to the conversion rate, there is no distinction between the polymerization of the monomers and the monomer decomposition).

The "polymer selectivity" represents the rate of polymer generation based on the consumed monomers, and upon calculating the monomer decomposition rate from the peak area of alcohol (monomer decompositions) in GC, is obtained as follows: [Polymer selectivity (%)]=[100(%)]−[monomer decomposition rate (%)].

<Polymerization Step>

In the production method according to the present invention, the reaction temperature of the polymerization step (polymerization temperature) may be appropriately selected depending on the kind of polymerization initiator, and reaction (polymerization) may be performed by changing the temperature gradually. Generally, the temperature is preferably within the range from 50 to 100° C. and especially preferably from 60 to 90° C.

The reaction time of the polymerization step varies depending on the type of reagent, amount, and the reaction temperature, and preferably is from 2 to 90 hours, more preferably 2 to 50 hours, and especially preferably from 3 to 30 hours.

The polymerization process is not particularly limited, for example, a monomer, a polymerization solvent, an additive, and a polymerization initiator may be fed into a reactor beforehand, and the polymerization can be initiated by elevating the temperature. The polymerization may also start by adding a polymerization initiator to a heated monomer or a monomer solution. The addition of the polymerization initiator may be done sequentially or in one time. These may also be combined and a portion of the polymerization initiator may be fed into the reactor and thereafter, the rest of the portion may be added sequentially to the reaction system. In the case of sequential addition, the operation becomes complex; however the polymerization reaction is easily controlled. When the additive is mixed with the solvent before it is added to the monomer, the additive is preferably mixed with the monomer beforehand since hydrolysis of the monomers proceeds.

After the reaction completed, the obtained vinyl ether polymer containing an oxyethylene chain can be isolated by treating with known operation and treatment process.

EXAMPLES

The present invention will be elaborated below with the aid of Examples; however, the present invention shall not be limited by the disclosure of the following Examples. Measurement in the following Examples was in accordance with the following measurement method.

pH was measured using Seven 2 Go manufactured by Mettler-Toledo K.K., by impregnating the electrode into a feed solution as of before polymerization.

The calculation of the monomer conversion rate and polymer selectivity in the polymerization reaction was conducted using gas chromatography (GC).

<Conditions>
Column: DB-1 (manufactured by Agilent Technologies K.K.) Temperature elevation program: retained for 5 minutes at 50° C.→temperature elevation at 10° C./min→retained for 5 minutes at 250° C.
Carrier gas: nitrogen
Column flow rate: 0.95 ml/min The weight average molecular weight (Mw) and the molecular weight distribution (Mw/Mn) of the homopolymer and the copolymer were analyzed by means of gel permeation chromatography (GPC).

<Conditions>
Column: Shodex GPC LF804×3 (manufactured by Showa Denko K.K.)
Solvent: tetrahydrofuran
Measurement Temperature: 40° C.
Flow Rate: 1.0 ml/min
Standard Curve: polystyrene standard Example 1: Production of Poly(2-methoxyethyl Vinyl Ether) (Addition of 0.10 Mol % of Lithium Hydroxide)

In to a flask, there were added a stirrer, 50 g (490 mmol) of 2-methoxy ethyl vinyl ether (herein under referred to as "MOVE"), 5.6 g (24.5 mmol, 5 mol % based on the monomer) of 2,2'-azobis methyl isobutyrate ("V-601" manufactured by Wako Pure Chemicals K.K., herein under referred to as "MAIB"), 44.4 g of ion exchange water, 0.012 g (0.50 mmol, 0.10 mol % based on the monomer) of lithium hydroxide, and the flask was plugged. The pH of the feed liquid was 9.4. Stirring was continued until MAIB was dissolved, then the flask was placed in a water bath which was preheated to 70° C., and heated with stirring for 7 hours to polymerize. After completion of polymerization, polymerization was stopped by cooling the flask in an ice bath to give an aqueous solution of poly(2-methoxy ethyl vinyl ether) (herein under referred to as "PMOVE"). The conversion rate of MOVE was 79%, in which the proportion the monomer converted to the polymer (herein under referred to as the "polymer selectivity") was 99%, Mw of PMOVE was 7710, and Mw/Mn was 1.59.

Example 2: Production of Poly(2-methoxyethyl Vinyl Ether) (Addition of 0.05 Mol % of Lithium Hydroxide)

PMOVE was synthesized in a similar manner as Example 1, except that the amount of lithium hydroxide added was changed to 0.0060 g (0.25 mmol, 0.05 mol % based on the monomer). The pH of the feed solution was 5.2. The conversion rate of MOVE was 81%, the polymer selectivity was 84%, Mw of PMOVE was 5000, and Mw/Mn was 1.56.

Example 3: Production of Poly(2-methoxyethyl Vinyl Ether) (Addition of 0.06 Mol % of Lithium Hydroxide)

PMOVE was synthesized in a similar manner as Example 1, except that the amount of lithium hydroxide added was changed to 0.0072 g (0.30 mmol, 0.06 mol % based on the monomer). The pH of the feed solution was 6.6. The conversion rate of MOVE was 85%, the polymer selectivity was 91%, Mw of PMOVE was 5220, and Mw/Mn was 1.68.

Example 4: Production of Poly(2-methoxyethyl Vinyl Ether) (Addition of 0.07 Mol % of Lithium Hydroxide)

PMOVE was synthesized in a similar manner as Example 1, except that the amount of lithium hydroxide added was changed to 0.0084 g (0.35 mmol, 0.07 mol % based on the monomer). The pH of the feed solution was 7.0. The conversion rate of MOVE was 85%, the polymer selectivity was 93%, Mw of PMOVE was 4910, and Mw/Mn was 1.67.

Example 5: Production of Poly(2-methoxyethyl Vinyl Ether) (Addition of 0.08 Mol % of Lithium Hydroxide)

PMOVE was synthesized in a similar manner as Example 1, except that the amount of lithium hydroxide added was changed to 0.0096 g (0.40 mmol, 0.08 mol % based on the monomer). The pH of the feed solution was 7.5. The conversion rate of MOVE was 85%, the polymer selectivity was 93%, Mw of PMOVE was 5240, and Mw/Mn was 1.73.

Example 6: Production of Poly(2-methoxyethyl Vinyl Ether) (Addition of 0.09 Mol % of Lithium Hydroxide)

PMOVE was synthesized in a similar manner as Example 1, except that the amount of lithium hydroxide added was changed to 0.0108 g (0.45 mmol, 0.09 mol % based on the monomer). The pH of the feed solution was 8.1. The conversion rate of MOVE was 86%, the polymer selectivity was 93%, Mw of PMOVE was 5390, and Mw/Mn was 1.70.

Example 7: Production of Poly(2-methoxyethyl Vinyl Ether) (Addition of 0.20 Mol % of Lithium Hydroxide)

PMOVE was synthesized in a similar manner as Example 1, except that the amount of lithium hydroxide added was changed to 0.024 g (1.0 mmol, 0.20 mol % based on the monomer). The pH of the feed solution was 11.5. The conversion rate of MOVE was 65%, the polymer selectivity was 100%, Mw of PMOVE was 7670, and Mw/Mn was 1.72.

Comparative Example 1: Production of Poly(2-methoxyethyl Vinyl Ether) (No Addition of Additive)

PMOVE was synthesized in a similar manner as Example 1, except that no additive was added. The pH of the feed solution was 4.3. The conversion rate of MOVE was 99%, the polymer selectivity was 26%, Mw of PMOVE was 3070, and Mw/Mn was 1.41.

Comparative Example 2: Production of Poly(2-methoxyethyl Vinyl Ether) (Addition of 0.01 Mol % of Lithium Hydroxide)

PMOVE was synthesized in a similar manner as Example 1, except that the amount of lithium hydroxide added was changed to 0.0012 g (0.050 mmol, 0.01 mol % based on the monomer). The pH of the feed solution was 4.5. The conversion rate of MOVE was 91%, the polymer selectivity was 43%, Mw of PMOVE was 2900, and Mw/Mn was 1.33.

The monomer conversion rate and the polymer selectivity in Examples 1 to 7 and Comparative Examples 1 and 2 are shown in the Figure.

From the results of Examples 1 to 7 and Comparative Examples 1 and 2, it is confirmed that the monomer decomposition is suppressed and the polymer selectivity is greatly improved in the polymerization of vinyl ether polymer containing an oxyethylene chain when a basic compound is added and the pH of the feed solution before polymerization was set to 5 or more.

Example 8: Production of Poly(2-methoxyethyl Vinyl Ether) (Addition of 0.20 Mol % of Lithium Hydroxide and 1 Mol % of MAIB)

PMOVE was synthesized in a similar manner as Example 1, except that the amount of lithium hydroxide added was changed to 0.024 g (1.0 mmol, 0.20 mol % based on the monomer) and of MAIB to 1.1 g (4.9 mmol, 1 mol % based on the monomer). The pH of the feed solution was 11.3. The conversion rate of MOVE was 43%, the polymer selectivity was 100%, Mw of PMOVE was 13770, and Mw/Mn was 1.53.

It is confirmed from the result of Example 8 that the molecular amount of the polymer increased by decreasing the amount of initiator used.

Example 9: Production of Poly(2-methoxyethyl Vinyl Ether) (Addition of 0.20 Mol % of Lithium Hydroxide and 0.2 Mol % of MAIB and Change of Polymerization Time)

PMOVE was synthesized in a similar manner as Example 1, except that the amount of lithium hydroxide added was changed to 0.024 g (1.0 mmol, 0.20 mol % based on the monomer) and of MAIB to 0.22 g (1.0 mmol, 0.2 mol % based on the monomer). Polymerization was conducted in times of the following three hours: 7 hours; 24 hours; and 87 hours. The pH of the feed solution was 11.5. The conversion rate of MOVE was 10% (7 hours), 30% (24 hours), and 86% (87 hours) respectively, and the polymer selectivity was all 100%. Mw of each PMOVE was 18560 (7 hours), 21200 (24 hours), and 20000 (87 hours) and Mw/Mn was 1.60 (7 hours), 1.70 (24 hours), and 1.67 (87 hours).

From the result of Example 9, it is confirmed that the monomer amount of the polymer can be further increased by reducing the amount of the initiator, and prolonging the polymerization time at that time can enhance the polymerization rate.

Example 10: Production of Poly(2-methoxyethyl Vinyl Ether) (Addition of 0.10 Mol % of Sodium Hydroxide)

PMOVE was synthesized in a similar manner as Example 1, except that the additive was changed to 0.020 g (0.50 mmol, 0.10 mol % based on the monomer) of sodium hydroxide. The pH of the feed solution was 9.6. The conversion rate of MOVE was 76%, the polymer selectivity was 99%, Mw of PMOVE was 7560, and Mw/Mn was 1.60.

Example 11: Production of Poly(2-methoxyethyl Vinyl Ether) (Addition of 0.10 Mol % of Ammonia)

PMOVE was synthesized in a similar manner as Example 1, except that the additive was changed to 0.033 g (content of ammonia 0.50 mmol, 0.10 mol % based on the monomer) of 25% ammonia water. The pH of the feed solution was 9.4. The conversion rate of MOVE was 88%, the polymer selectivity was 83%, Mw of PMOVE was 4480, and Mw/Mn was 1.58.

Example 12: Production of Poly(2-methoxyethyl Vinyl Ether) (Addition of 0.10 Mol % of Triethylamine)

PMOVE was synthesized in a similar manner as Example 1, except that the additive was changed to 0.050 g (0.50 mmol, 0.10 mol % based on the monomer) of triethylamine. The pH of the feed solution was 9.4. The conversion rate of MOVE was 85%, the polymer selectivity was 85%, Mw of PMOVE was 4460, and Mw/Mn was 1.69.

Comparative Example 3: Production of Poly(2-methoxyethyl Vinyl Ether) (Addition of 0.10 Mol % of Lithium Chloride)

PMOVE was synthesized in a similar manner as Example 1, except that the additive was changed to 0.021 g (0.50 mmol, 0.10 mol % based on the monomer) of lithium chloride. The pH of the feed solution was 4.4. The conversion rate of MOVE was 99%, the polymer selectivity was 24%, Mw of PMOVE was 2860, and Mw/Mn was 1.40.

Comparative Example 4: Production of Poly(2-methoxyethyl Vinyl Ether) (Addition of 0.10 Mol % of Lithium Bromide)

PMOVE was synthesized in a similar manner as Example 1, except that the additive was changed to 0.043 g (0.50 mmol, 0.10 mol % based on the monomer) of lithium bromide. The pH of the feed solution was 4.2. The conversion rate of MOVE was 99%, the polymer selectivity was 23%, Mw of PMOVE was 2840, and Mw/Mn was 1.37.

Comparative Example 5: Production of Poly(2-methoxyethyl Vinyl Ether) (Addition of 0.10 Mol % of Lithium Iodide)

PMOVE was synthesized in a similar manner as Example 1, except that the additive was changed to 0.066 g (0.50 mmol, 0.10 mol % based on the monomer) of lithium iodide. The pH of the feed solution was 4.3. The conversion rate of MOVE was 99%, the polymer selectivity was 21%, Mw of PMOVE was 2810, and Mw/Mn was 1.37.

Comparative Example 6: Production of Poly(2-methoxyethyl Vinyl Ether) (Addition of 0.05 Mol % of Lithium Sulfate)

PMOVE was synthesized in a similar manner as Example 1, except that the additive was changed to 0.028 g (0.25 mmol, 0.05 mol % based on the monomer) of lithium sulfate. The pH of the feed solution was 4.4. The conversion rate of MOVE was 99%, the polymer selectivity was 22%, Mw of PMOVE was 2650, and Mw/Mn was 1.31.

Comparative Example 7: Production of Poly(2-methoxyethyl Vinyl Ether) (Addition of 0.10 Mol % of Sodium Chloride)

PMOVE was synthesized in a similar manner as Example 1, except that the additive was changed to 0.029 g (0.50 mmol, 0.10 mol % based on the monomer) of sodium chloride. The pH of the feed solution was 4.4. The conversion rate of MOVE was 99%, the polymer selectivity was 25%, Mw of PMOVE was 2150, and Mw/Mn was 1.42.

It was confirmed from the results of Examples 10 to 12 and Comparative Examples 3 to 7 that only the basic compounds used as the additive that become basic in water will exhibit the suppression effect of decomposition of the monomer of vinyl ether containing oxyethylene chain.

Example 13: Production of Polytriethylene Glycol Monomethyl Vinyl Ether (Addition of 0.10 Mol % of Lithium Hydroxide)

In to a flask, there were added a stirrer, 50 g (263 mmol) of triethylene glycol monomethyl vinyl ether (herein under referred to as "TEGMVE"), 3.0 g (13 mmol, 5 mol % based on the monomer) of MAIB, 46.9 g of ion exchange water, 0.0063 g (0.26 mmol, 0.10 mol % based on the monomer) of lithium hydroxide, and the flask was plugged. The pH of the feed liquid was 9.4. Stirring was continued until MAIB was dissolved, then the flask was placed in a water bath which was preheated to 70° C., and heated with stirring for 7 hours to polymerize. After completion of the polymerization, polymerization was stopped by cooling the flask in an ice bath to give an aqueous solution of polytriethylene glycol monomethyl vinyl ether (herein under referred to as "PTEGMVE"). The conversion rate of PTEGMVE was 89%, the polymer selectivity was 90%, Mw of PTEGMVE was 6650, and Mw/Mn was 1.55.

Example 14: Production of Polytriethylene Glycol Monomethyl Vinyl Ether (Addition of 0.10 Mol % of Sodium Hydroxide)

PTEGMVE was synthesized in a similar manner as Example 13, except that the amount of sodium hydroxide added was changed to 0.011 g (0.26 mmol, 0.10 mol % based on the monomer). The pH of the feed solution was 9.4. The conversion rate of PTEGMVE was 90%, the polymer selectivity was 94%, Mw of PTEGMVE was 6890, and Mw/Mn was 1.59.

Example 15: Production of Polytriethylene Glycol Monomethyl Vinyl Ether (Addition of 0.20 Mol % of Ammonia)

PTEGMVE was synthesized in a similar manner as Example 13, except that the additive was changed to 0.035 g (0.52 mmol, 0.20 mol % based on the monomer) of 25% ammonia water. The pH of the feed solution was 9.9. The conversion rate of PTEGMVE was 91%, the polymer selectivity was 87%, Mw of PTEGMVE was 6720, and Mw/Mn was 1.53.

Example 16: Production of Polytriethylene Glycol Monomethyl Vinyl Ether (Addition of 0.10 Mol % of Triethylamine)

PTEGMVE was synthesized in a similar manner as Example 13, except that the additive was changed to 0.050 g (0.26 mmol, 0.10 mol % based on the monomer) of triethylamine. The pH of the feed solution was 10.0. The conversion rate of PTEGMVE was 93%, the polymer selectivity was 82%, Mw of PTEGMVE was 6160, and Mw/Mn was 1.57.

Comparative Example 8: Production of Polytriethylene Glycol Monomethyl Vinyl Ether (No Addition of Additive)

PTEGMVE was synthesized in a similar manner as Example 13, except that no additive was added. The pH of the feed solution was 5.5. The conversion rate of PTEGMVE was 98%, the polymer selectivity was 22%, Mw of PTEGMVE was 3370, and Mw/Mn was 1.45.

Comparative Example 9: Production of Polytriethylene Glycol Monomethyl Vinyl Ether (Addition of 0.10 Mol % of Lithium Chloride)

PTEGMVE was synthesized in a similar manner as Example 13, except that the additive was changed to 0.11 g (0.26 mmol, 0.10 mol % based on the monomer) of lithium chloride. The pH of the feed solution was 5.4. The conversion rate of PTEGMVE was 100%, the polymer selectivity was 24%, Mw of PTEGMVE was 3500, and Mw/Mn was 1.50.

It was confirmed from the results of Examples 13 to 16 and Comparative Examples 8 and 9 that in order to proceed radical polymerization while suppressing the monomer decomposition, pH adjustment is necessary with vinyl ether containing an oxyethylene chain other than the MOVE by adding a basic compound.

TABLE 1

| | | Additive | | Used Amount of Polymerization Initiator (mol %) | pH | Monomer Conversion Rate (%) | Polymer Selectivity (%) | Polymer Weight Average Molecular Weight Mw | Molecular Weight Distribution Mw/Mn |
|---|---|---|---|---|---|---|---|---|---|
| | Monomer | Type | Used Amount (mol %) | | | | | | |
| Example 1 | MOVE | LiOH | 0.1 | 5 | 9.4 | 79 | 99 | 7710 | 1.59 |
| Example 2 | MOVE | LiOH | 0.05 | 5 | 5.2 | 81 | 84 | 5000 | 1.56 |
| Example 3 | MOVE | LiOH | 0.06 | 5 | 6.6 | 85 | 91 | 5220 | 1.68 |
| Example 4 | MOVE | LiOH | 0.07 | 5 | 7.0 | 85 | 93 | 4910 | 1.67 |
| Example 5 | MOVE | LiOH | 0.08 | 5 | 7.5 | 85 | 93 | 5240 | 1.73 |
| Example 6 | MOVE | LiOH | 0.09 | 5 | 8.1 | 86 | 93 | 5390 | 1.70 |
| Example 7 | MOVE | LiOH | 0.2 | 5 | 11.5 | 65 | 100 | 7670 | 1.72 |
| Example 8 | MOVE | LiOH | 0.2 | 1 | 11.3 | 43 | 100 | 13770 | 1.53 |
| Example 9 | MOVE | LiOH | 0.2 | 0.2 | 11.5 | 86(87 h) | 100(87 h) | 20000(87 h) | 1.67(87 h) |
| Example 10 | MOVE | NaOH | 0.1 | 5 | 9.6 | 76 | 99 | 7560 | 1.60 |
| Example 11 | MOVE | NH$_3$aq | 0.1 | 5 | 9.4 | 88 | 83 | 4480 | 1.58 |
| Example 12 | MOVE | TEA | 0.1 | 5 | 9.4 | 85 | 85 | 4460 | 1.69 |
| Example 13 | TEGMVE | LiOH | 0.1 | 5 | 9.4 | 89 | 90 | 6650 | 1.55 |

TABLE 1-continued

| | | Additive | Used Amount | | | | Polymer | |
| | Monomer | Type | Used Amount (mol %) | Polymerization Initiator (mol %) | pH | Monomer Conversion Rate (%) | Polymer Selectivity (%) | Weight Average Molecular Weight Mw | Molecular Weight Distribution Mw/Mn |
|---|---|---|---|---|---|---|---|---|---|
| Example 14 | TEGMVE | NaOH | 0.1 | 5 | 9.4 | 90 | 94 | 6890 | 1.59 |
| Example 15 | TEGMVE | NH$_3$aq | 0.2 | 5 | 9.9 | 91 | 87 | 6720 | 1.53 |
| Example 16 | TEGMVE | TEA | 0.1 | 5 | 10.0 | 93 | 82 | 6160 | 1.57 |
| Comparative Example 1 | MOVE | — | 0 | 5 | 4.3 | 99 | 26 | 3070 | 1.41 |
| Comparative Example 2 | MOVE | LiOH | 0.01 | 5 | 4.5 | 91 | 43 | 2900 | 1.33 |
| Comparative Example 3 | MOVE | LiCl | 0.1 | 5 | 4.4 | 99 | 24 | 2860 | 1.40 |
| Comparative Example 4 | MOVE | LiBr | 0.1 | 5 | 4.2 | 99 | 23 | 2840 | 1.37 |
| Comparative Example 5 | MOVE | LiI | 0.1 | 5 | 4.3 | 99 | 21 | 2810 | 1.37 |
| Comparative Example 6 | MOVE | Li$_2$SO$_4$ | 0.05 | 5 | 4.4 | 99 | 22 | 2650 | 1.31 |
| Comparative Example 7 | MOVE | NaCl | 0.1 | 5 | 4.4 | 99 | 25 | 2150 | 1.42 |
| Comparative Example 8 | TEGMVE | — | 0 | 5 | 5.5 | 98 | 22 | 3370 | 1.45 |
| Comparative Example 9 | TEGMVE | LiCl | 0.1 | 5 | 5.4 | 100 | 24 | 3500 | 1.50 |

The invention claimed is:

1. A method for producing a vinyl ether polymer containing an oxyethylene chain, comprising the step of polymerizing a vinyl ether represented by formula (1) in the presence of water as a polymerization solvent, a basic compound as an additive, and an organic azo-based compound as a radical polymerization initiator, and in pH of 5 or more, and the amount of the basic compound used is 0.05 to 0.2 mol % based on an amount of the vinyl ether, formula (1)

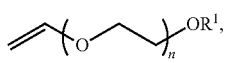

wherein R$^1$ represents an alkyl group having 1 to 3 carbons, and n represents an integer from 1 to 10.

2. The production method according to claim 1, wherein the basic compound is an alkali metal hydroxide or an amine compound.

3. The production method according to claim 1, wherein the organic azo-based compound is a compound represented by formula (2):

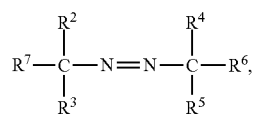

wherein R$^2$ to R$^5$ each independently represent a hydrogen atom or an alkyl group, and wherein R$^6$ and R$^7$ each independently represent a nitrile group, an ether group having an alkoxy moiety optionally having a substituent, or an amide group having an alkylamino moiety optionally having a substituent.

4. The production method according to claim 1, wherein the organic azo-based compound is an azo ether compound.

5. The production method according to claim 1, wherein the weight average molecular weight of the vinyl ether polymer is 3000 to 50000.

6. The production method according to claim 1, wherein the polymer selectivity is 70% or more.

* * * * *